United States Patent [19]
James

[11] 3,953,187
[45] Apr. 27, 1976

[54] CONTROL SYSTEM FOR HYDRAULIC RAMS

[75] Inventor: Richard L. James, Anderson, Ind.
[73] Assignee: Lynch Corporation, Anderson, Ind.
[22] Filed: Mar. 19, 1975
[21] Appl. No.: 559,702

Related U.S. Application Data
[63] Continuation of Ser. No. 423,182, Dec. 10, 1973, abandoned.

[52] U.S. Cl. .................................. 65/161; 65/81; 65/318
[51] Int. Cl.² ........................................ C03B 11/16
[58] Field of Search ................ 65/81, 318, 160, 161

[56] References Cited
UNITED STATES PATENTS

| | | | |
|---|---|---|---|
| 3,337,325 | 8/1967 | Bittner et al. .................... | 65/318 X |
| 3,634,060 | 1/1972 | Dahlman et al. ................. | 65/318 X |
| 3,762,906 | 10/1973 | Dahlman et al. .................. | 65/160 |

FOREIGN PATENTS OR APPLICATIONS
984,110  2/1951  France .................................. 65/318

*Primary Examiner*—Arthur D. Kellogg
*Attorney, Agent, or Firm*—Allegretti, Newitt, Witcoff & McAndrews

[57] ABSTRACT

A control system for operating the ram vertically movable in and out of a glass mold. The control system for operating the ram includes a hydraulic pump, a hydraulic fluid reservoir, and a hydraulic cylinder which is interconnected to the pump and to the reservoir. A vertically reciprocal piston is positioned in the cylinder. Valve means control the flow of hydraulic fluid from the pump and reservoir to the chambers defined on opposite sides of the piston. The operating system includes a first control of hydraulic fluid and fluid pressure to the first chamber and from the second chamber for rapidly lowering or permitting free fall of the ram towards the mold by action of gravity and a second control means of the fluid pressure on both sides of the piston to reduce the speed of the ram to pressing speed and finally to a fixed pressing position. The system also includes further controls for gradually breaking the ram away from the mold at a relatively slow speed and for controlling the flow of fluid and the pressure in the two chambers to rapidly raise the ram.

9 Claims, 6 Drawing Figures

CONTROL SYSTEM FOR HYDRAULIC RAMS

This is a continuation of application Ser. No. 423,182, filed Dec. 10, 1973, now abandoned.

BACKGROUND OF THE INVENTION FIELD OF THE INVENTION and DESCRIPTION OF THE PRIOR ART This invention relates to a mechanism for controlling the movement of a hydraulic ram of the type which is used in conjunction with forming glassware in a mold of a glass making machine.

One common type of glass making machine utilizes a vertically reciprocal ram or plunger which is movable to a molding relationship with a mold member, at a fixed position relative to the ram, so that the molten glass contained within the mold is formed between the ram and the mold to provide a glass product of the desired shape. In such machines, it is conventional for the ram to remain in engagement with the mold until such time as the glassware is properly cooled and in a set or rigid condition. The ram is then raised from the glassware and the table carrying the mold is indexed to another position, as for cooling or to the take-out position. An open mold is then moved into position below the ram for forming another glass product of the desired shape. Each cycle of operation of the ram involves a downward movement of the ram into the mold area, a rest period in the mold area to allow time for the ware to properly set, and an upper dwell position while the mold with the formed glass product is moved away from the position below the mold and while the next mold is moved into position for the formation of a glass product or ware therein by the ram.

These machines generally have a predetermined production rate which means that each ram has a predetermined time period to complete its up-down cycle. It is generally considered to be desirable to hold the ram within the mold for as long a period as possible so as to better form the product without the distortion and without wrinkles developing thereon. In other words, the longer that the ram is in the mold, the longer the time there is for cooling and setting the ware to provide the improved product. Since the time that the ram is in the mold is only a fraction of the total up-down cycle time for the ram, any increase in the time required to move the ram to and/or from the mold can be used to better advantage by using the saved time as dwell time for the ram in the mold for providing an improved product. It is clearly highly advantageous to increase the time that a ram is in a mold without increasing the overall cycle time of the machine or of the ram.

In order to produce formed glassware products of high quality, relatively high pressing or ram forces are generally considered desirable in order to hold the ram in firm engagement with the mold during the time that the ware is being formed between the ram and the mold. One way in which this is sometimes accomplished is by means of a toggle mechanism which increases the ram force while still using a smaller initial force in the toggle operating cylinder. Toggle mechanisms, however, are generally considered to be expensive and require more maintenance than is desirable in a glass making machine.

It is also considered advantageous in glass making machines to provide ram motion which is adjustable and provides a constant speed pressing action as the ram comes into contact with the molten glass being formed. Another factor that is considered important in the formation of glass product, in a glass making machine of the described type, is the gradual movement or easing of the ram out of the formed glass product in order to prevent distortion of the glass product.

SUMMARY OF THE INVENTION

It is therefore an important object of this invention to provide an improved control system for operating a vertically reciprocal hydraulic ram of the type commonly used in a glass making machine wherein the control system has significant advantages over prior art mechanisms.

It is also an object of this invention to provide an improved control system for operating a ram in a glass making machine wherein the dwell time of the ram in the mold to provide an improved glass product is extended without extending the overall ram cycle time.

It is a further object of this invention to provide an improved control system for operating the hydraulic ram of glass making machines wherein the control system is characterized by hydraulic circuitry which is a simple, yet effective operation.

It is still another object of this invention to provide a hydraulic ram system for use in a glass making machine wherein the time that the ram is positioned within the mold for forming a glass product is extended by reducing the time required to move the ram down into the mold by providing a control system which permits free fall of the ram until shortly before the ram enters the mold.

It is still another object of this invention to provide an improved control system for a hydraulic ram in a glass making machine wherein relatively high plunger or ram forces are provided without the need of a toggle mechanism.

It is still another object of this invention to provide a control system for operating the hydraulic ram of a glass making machine wherein the pressing action of the ram into the mold is relatively smooth, adjustable, and has a substantially constant speed.

It is also a further object of this invention to provide a control system for operating the hydraulic ram of a glass making machine wherein the mechanism enables the ram or plunger to be eased out of the mold to avoid distortion of the molded product.

Further purposes and objects of this invention will appear as the specification proceeds.

The foregoing objects are accomplished by providing an improved control system for use in a glass making machine having a mold, and a ram movable into the mold to form a glass product of the desired shape between the ram and the mold wherein the control system includes a hydraulic cylinder, a piston which is vertically movable in the cylinder, first and second cylinder chambers being defined on opposite sides of the piston, a piston rod rigidly interconnecting the ram to the piston, hydraulic pump means, valve means, means for operating the pump means, and the valve means, including first control means for controlling the flow of hydraulic fluid to the first cylinder chamber and from the second cylinder chamber for rapidly lowering said ram into said mold by action of gravity, and the operating means also includes second control means for controlling the hydraulic fluid pressure and flow on both sides of the piston in both of said chambers to reduce the speed of the ram to pressing speed and to a fixed pressing position for forming the glass between the mold and the ram.

BRIEF DESCRIPTION OF THE DRAWINGS

A particular embodiment of the present invention is illustrated in the accompanying drawings wherein.

DETAILED DESCRIPTION OF THE PREFERRED EMBODIMENT

Figure 1:
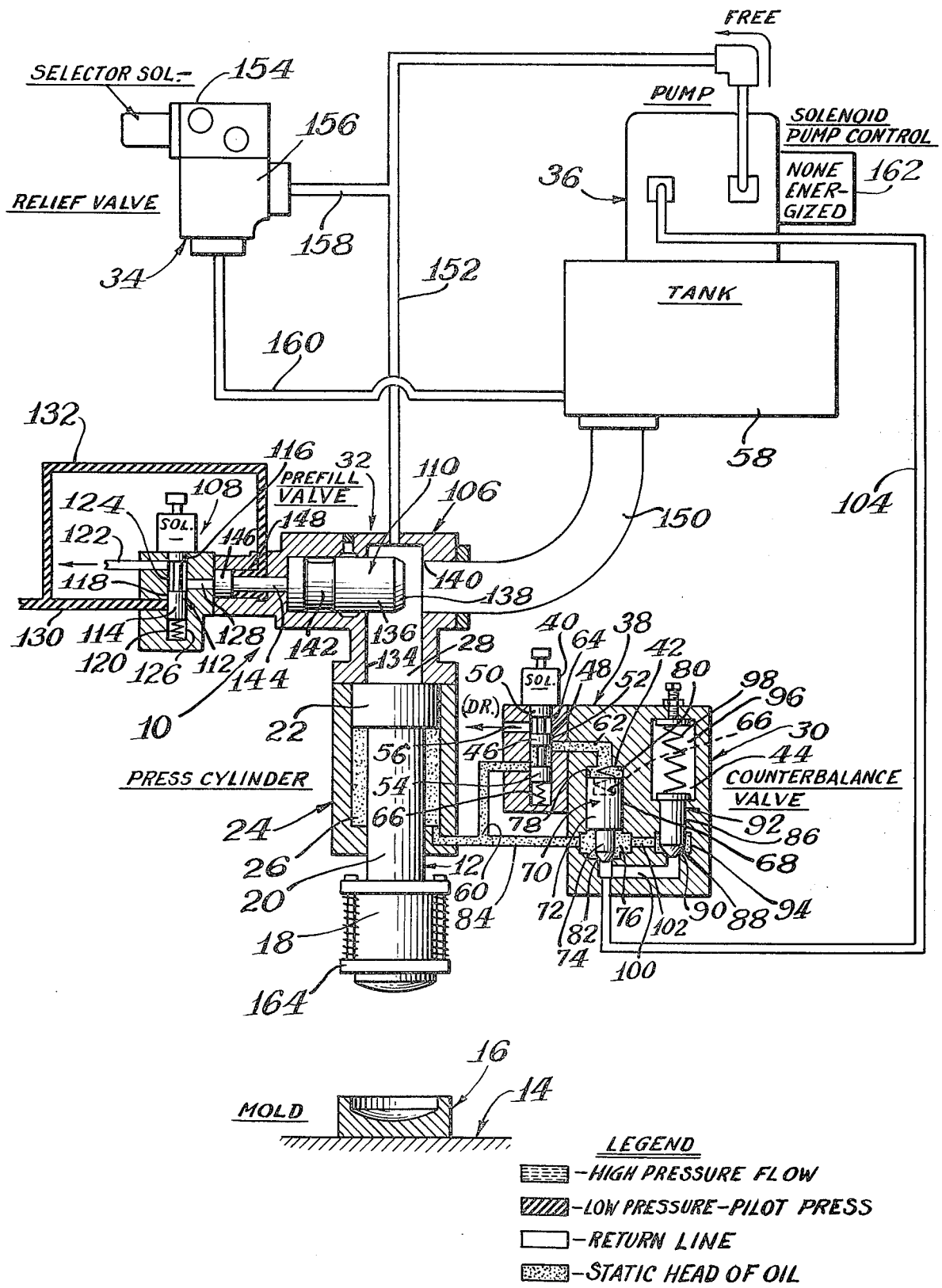
FIG. 1 is a schematic diagrammatic view of a preferred control system for reciprocally operating a hydraulic press ram useful in a glass making machine for forming a glass product in a mold, the control system being shown while the ram is in the full up raised, dwell position.

Referring to the drawings, my improved control system, generally 10, used for the operation of a press ram in a glass making machine is schematically shown. A support table, generally 14, supporting a mold 16, is schematically shown in the drawings. Each of the figures schematically shows the manner in which the control system 10 controls the reciprocating movement of a press ram 12 for movement in and out of the mold 16 for the formation of a glass product between the ram 12 and the mold 16. Although the control system 10, described and illustrated herein, is useful for controlling the operation of press rams in a variety of machines, the principal purpose of the control system 10 is for controlling the operation of a ram in a glass making machine, particularly of the type wherein the ram is vertically reciprocal between raised and lowered, pressing positions.

As schematically shown, the ram 12, has an enlarged lower head 18, the lower portion thereof being sized and shaped to be received within the mold 16 to form a glass product W of the desired shape therebetween. The ram head 18 is rigidly affixed, at its upper portion, to a piston rod 20. The rod 20, in turn, is fixedly secured at its upper end to a piston 22. A fixed press cylinder 24 slidably carries the piston 22 for imparting reciprocal motion to the ram 12. The press cylinder 24 is positioned in a substantially vertical position for providing vertical reciprocating of the ram 12. A lower cylinder chamber 26 is defined within the cylinder 24 below the piston 22 at its rod end while an upper cylinder chamber 28 is defined above the piston 22 at its blind end. The mold table 14 is generally horizontally positioned and movable, as in a rotary direction. The table 14 acts as support for a plurality of molds 16 which are moved to a position aligned below the ram 12.

The control system 10 for operating the ram 12 generally includes a counterbalance valve, generally 30, a prefill valve, generally 32, a relief valve generally 34, and a hydraulic pump assembly, generally 36.

The valves control the flow and pressure within the cylinder chambers 26 and 28 for reciprocating the ram 12 in the desired manner. The system 10, as will be described, results in an important advantage of permitting a rapid free fall or gravity dropping of the ram 12, while at the same time, controlling the movement of the ram 12 into the mold 16. The rapid free fall permits the ram 12 to remain within the mold 16 for an extended length of time to provide an improved glass product while at the same time, it is not necessary to increase the overall cycle time for the reciprocation of the ram 12, since the time saved in the free fall is used to advantage by adding to the dwell time of the ram in the mold.

The counterbalance valve 30 includes a housing, generally 38, which operatively carries a solenoid operated valve 40, a pressure sensitive piston valve 42, and a spring biased adjustable valve 44.

The solenoid valve 40 is mounted on the housing 38 and includes a reciprocal spool 46 which is slidably movable in a cylinder chamber 48. The spool 46 includes an upper piston 50, an intermediate piston 52 and a lower piston 54, all rigidly interconnected. The upper portion of the cylinder chamber 48 communicates with a drain or vent line 56 which is interconnected to the hydraulic fluid reservoir or tank 58 by a fluid line (not shown). The central portion of the chamber 48 interconnects to a hydraulic line 60 which, in turn, communicates with the lower chamber 26 of the press cylinder 24. The central portion of the cylinder chamber 48 also communicates with an interconnecting line 62 which communicates with the upper chamber 64 of the portion of the housing 38 slidably carrying the piston valve 42. A compression spring 66 is located in the lower portion of the cylinder chamber 48 and normally biases the spool 46 upwardly into the position shown, for example, in FIG. 1.

The piston valve 42 is reciprocally movable within a cylinder 68 defined within the housing 38. The valve 42 includes a reciprocal member 70 having an upper enlarged piston portion 72 which is slidably movable within the cylinder 68. The lower portion of the reciprocal member 70 has a valve portion 74 of reduced diameter, positioned thereon. The cylinder 68 includes a lower chamber 76 and an upper chamber 78 defined on opposite sides of the sliding piston 72. A spring 80 normally biases the reciprocal member 70 in a downward direction with the valve portion 74 contacting a valve seat 82 defined in the lower end of the cylinder chamber 68. The lower chamber 76 communicates through a line with the hydraulic line 60 which also interconnects with the lower chamber 26 of the cylinder 24. The upper chamber 78 of the cylinder 68 communicates with the interconnecting line 62 from the chamber 48, as previously described.

The third valve section of the counterbalance valve 30 comprises the adjustable valve 44 which includes a reciprocal piston 86 having a valve portion 88 at its lower end which sealably seats on a valve set 90 in the lower portion of the chamber 92. The piston 86 is reciprocal within the chamber 92, which is a part of the lower chamber portion 94 in which the valve seat 90 is positioned. The cylinder chamber 92 also includes an upper chamber 96 in which a biasing spring 98 is located for normally urging the piston 86 in a downward direction for seating the valve portion 88 on the valve seat 90. A connecting hydraulic line 100 interconnects the lower chamber 94 of the cylinder chamber 92 to the lower chamber 76 of the piston valve 42. Both lower chambers 76 and 94 are in communication above the valve seats by a hydraulic line 102. In addition to the line 100 connecting the lower chambers 76 and 94 below their respective valve seats, a line 104 interconnects both chambers 74 and 76 below the valve seats 82 and 90 to the pump 36.

The prefill valve 32 of the control system includes a housing 106 which operatively carries a solenoid operated piston valve, generally 108, and a laterally reciprocal piston valve 110. The solenoid valve 108 includes a vertically reciprocal piston-spool 112 which has a lower piston portion 114 and an interconnected upper piston portion 116. The spool 112 is vertically reciprocal within a chamber 118 defined within the housing 106. A compression spring 120 normally biases the spool 112 upwardly. The upper portion of the chamber 118 interconnects to a drain line 122 which is connected to the hydraulic fluid reservoir or tank 58. The chamber 118 includes an upper portion 124 and a lower portion 126. The upper chamber 124, between pistons 114 and 116, communicates with a conduit 128. The lower chamber 126 communicates with a line 130 which also communicates with a bypass line 132.

Figure 3:
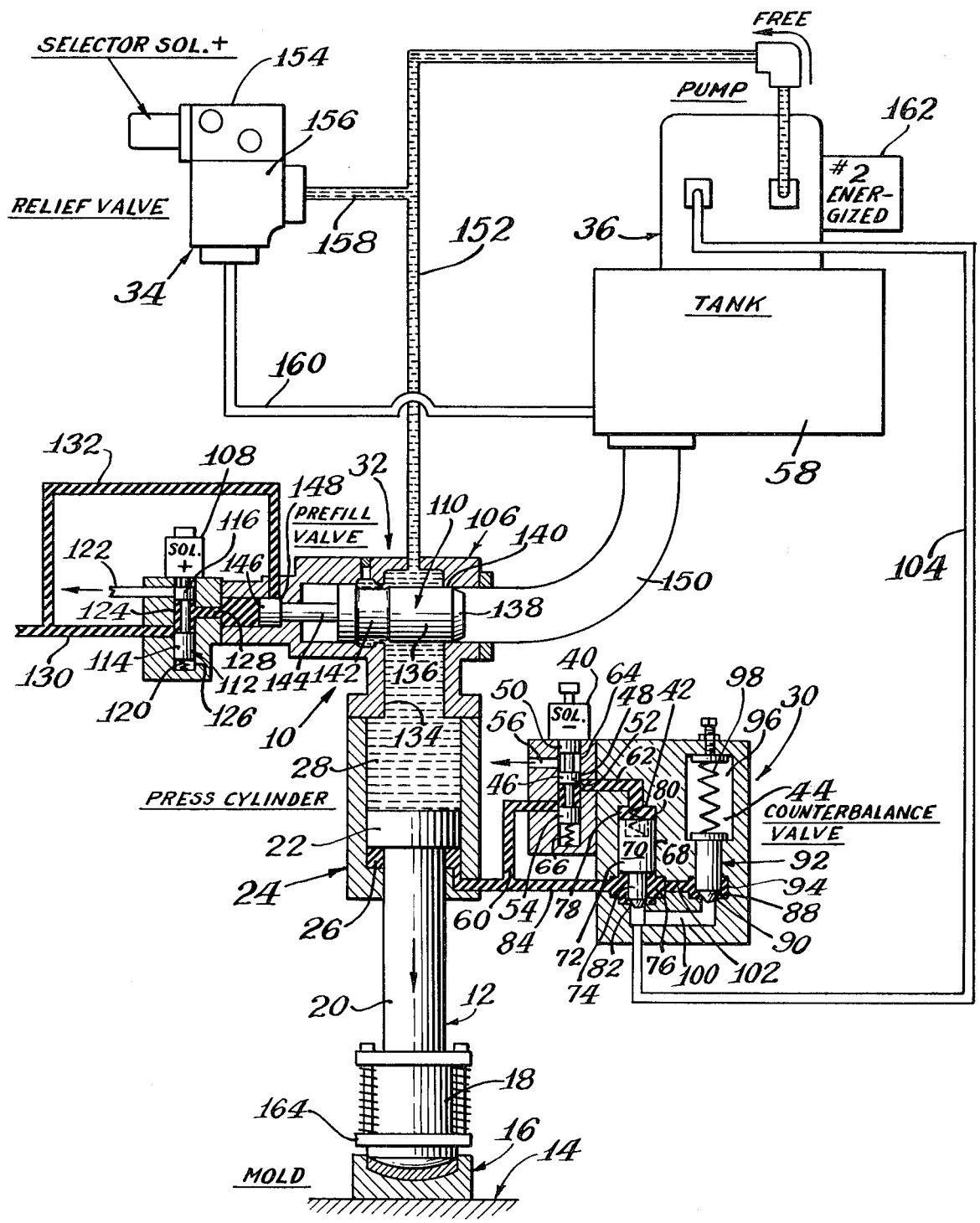
FIG. 3 is a view, similar to FIGS. 1 and 2, except the control system and ram are shown as the ram is approaching, but not yet at the pressing position.

The valve 110 is reciprocal in a lateral direction and communicate with an enlarged, upright cylinder portion 134 which is axially aligned directly above the cylinder 24. The laterally reciprocal valve 110 includes an enlarged piston portion 138 having an end portion thereon. The end 138 is movable past the lateral opening 140 in the cylinder portion 134, and, as seen in FIG. 3, forms a seal therewith. The enlarged portion 136 also includes an intermediate recess 142. The rod end of the enlarged piston portion 136 is rigidly connected to a piston rod 144 which, in turn, rigidly interconnects with a piston 146 of reduced diameter. The piston 146 is slidable within a transverse cylinder portion 148, with the cylinder 148 and the rod end of the piston 146 communicating with the bypass line 132. The blind end of the piston 146 communicates with the conduit 128.

The lateral opening 140 is defined at the lower portion of an open gravity feed line 150 passing from the bottom of the hydraulic fluid reservoir or tank 58. The valve 110 is laterally movable in and out of slidable engagement with the opening 140 to open and close hydraulic feed from the gravity feed line 150. The upper end of the cylinder portion 134 communicates with a flow conduit 152 which interconnects with the hydraulic pump 36.

The relief valve 34 includes an electrically operated electric solenoid 154 which controls the flow of hydraulic fluid to the valve portion 156. The valve portion 156 communicates through a line 158 to the pump line 152 passing between the cylinder chamber 134 and pump 136 while a return line 160 passes from the valve portion 156 to the hydraulic fluid tank 58.

The pump 36 includes a control section 162 which contains solenoids for controlling flow in the lines 104 and 152, for controlling the direction of fluid flow passing from the pump 36 to the valves 30, 32 and 34. The operation of the ram 12 and control system 10 will be described in detail by referring to the accompanying drawings, which schematically show the sequencing of the valves 30, 32, and 34 and pump 36 for controlling the operation of the ram 12 in the molding of glass articles.

Referring to FIG. 1 the ram 12 is shown in the raised position. A static pressure head of hydraulic fluid is in the lower chamber 26 holding the piston 22 aand thereby the ram 18 in the raised position. The pump 36 is in the stopped condition and the solenoids in the pump control 162 and the solenoids 40 and 108 are de-energized.

In the counterbalance valve 30, the solenoid valve 40 is de-energized and the spool 46 is in the full up position. In the piston valve 42, the biasing spring 66 maintains the valve portion 74 seated against the valve seat 82. In the adjustable valve 44 of the counterbalance valve 30, the biasing spring 98 maintains the valve seat 88 of the piston 86 against the valve seat 90.

In the prefill valve 32, the end portion 138 is spaced away from the valve opening 140 of the gravity feed line 150 passing from the reservoir 158. Pressure in the chamber 148 of the prefill valve 32 acts against the rod end of the piston 146 to hold the piston 110 in the full retracted and open position. The relief valve 34 is also inoperative since the solenoid valve 154 is de-energized.

Figure 2:
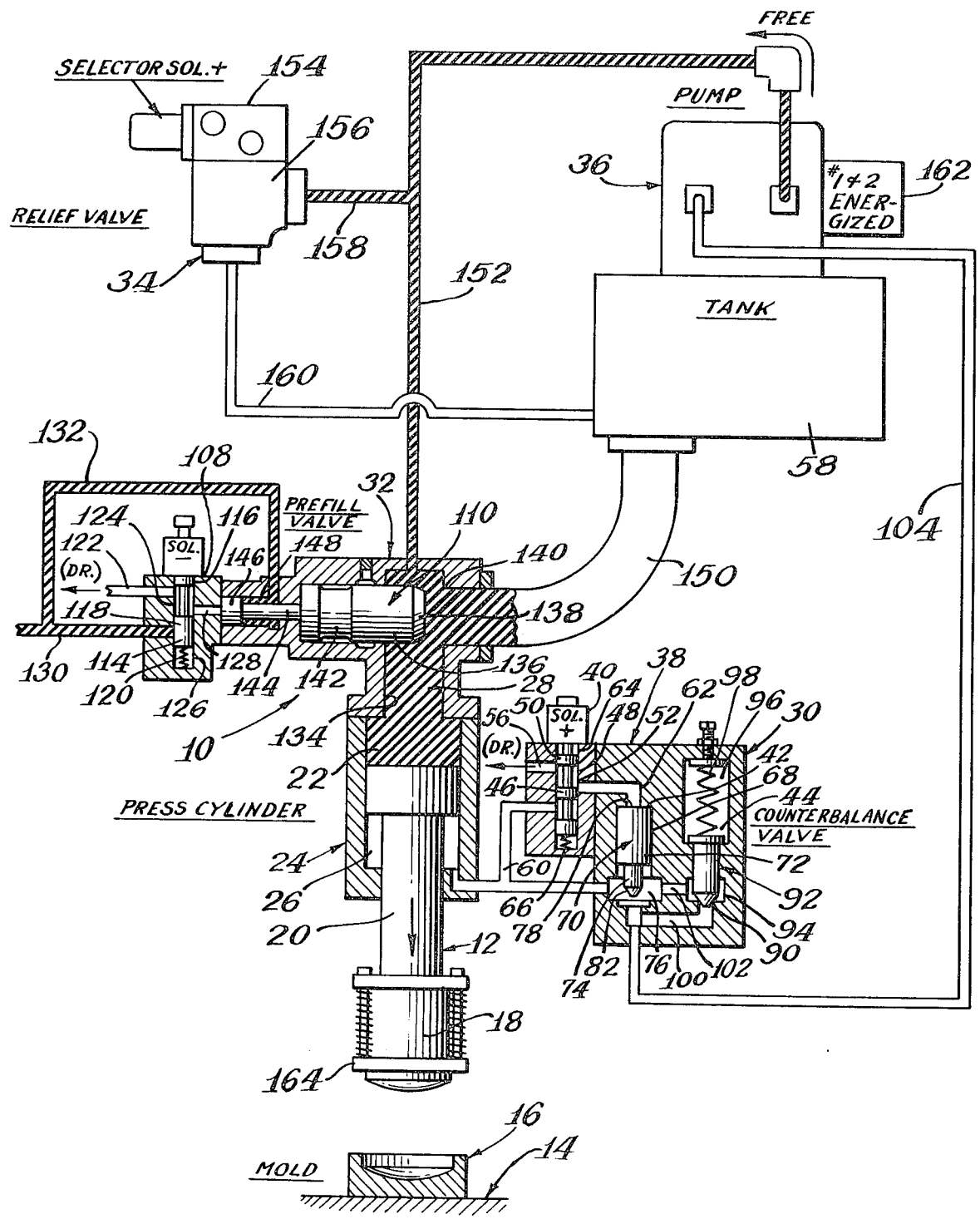
FIG. 2 is a view, similar to FIG. 1, except the control system and ram are shown during the free fall of the ram towards the mold area.

An air signal from a timer (not shown) for operating the glass molding machine trips an air operated limit switch (not shown) which energizes the solenoid valve 40 in the counterbalance valve 30. Referring to FIG. 2, the spool 56 moves downwardly, in response to the energizing of the solenoid 40, relieving the static pressure in the lower chamber 26 by opening the connecting line 62 to the vent line 56. When this occurs, the static pressure in the chamber 76 below the piston valve 42 overcomes the biasing pressure of the spring 66 to raise the piston 72 upwardly and moving the valve portion 74 away from the valve seat 82. At the same time, two solenoid valves, No. 1 and No. 2, in the pump control 62, are both energized and line 104 relieves static pressure in the chamber 26 through the valve 42, permitting hydraulic fluid to return to the tank through the exhaust line 104.

The pump 36 is also operative and creates low pressure fluid flow through the line 152 and into the upper chamber 28. Since the prefill valve piston 136 is open to the gravity feed line 150, hydraulic fluid gravity flows from the tank 58 through the line 150 to maintain in the press cylinder 24, in the upper chamber 28, full of hydraulic fluid or oil. By maintaining the valve 136 in the open condition, control is maintained over the operation of the press ram 12 while preventing cavitation during the rapid downward or free fall of the ram 12. It is seen that the low pressure and flow in the upper chamber 28 from the pump 36, the relief of pressure in the chamber 26, the weight of the ram 12, rod 20 and piston 22, and the gravity feed of oil from the tank 58 all cooperate to permit the rapid free fall of the ram 12. The lower chamber 26 is open to atmosphere in the tank 58 through the line 104 and counterbalance-balance valve 30. The press ram 12 moves downwardly in a substantially gravity drop or free fall condition, which is rapid and enables more time to be available for the pressing of the article in the mold 14 in order to provide an improvement product. Even though there is a free fall condition, the control system completely controls the free fall condition.

Referring to FIG. 3, the ram 12 and control system 10 are shown as the ram head 18 approaches the lower end of the downward stroke. A second air signal from the machine timer (not shown) momentarily trips a second air operated limit switch (not shown) for energizing the solenoid valve 108 of the prefill valve 32. At approximately the same time, the solenoid valve 40 of the counterbalance valve 30 is de-energized so as to move the spool 46 upwardly and close the line 62 to the vent or drain line 56. Also, at the same time, the fluid pressure in the lower chamber 26 is applied in the lines 60 and 62 to force the piston valve 42 downwardly until the valve portion 74 seats against the valve seat 82 to thereby control hydraulic volume below the piston 22 and within the lower chamber 26. When this occurs, the free fall of the press ram 12 is stopped because of the hydraulic fluid which is trapped between the counterbalance valve 30 and the press cylinder chamber 26 below the piston 22.

Also referring to FIG. 3, the solenoid 154 of the relief valve 34 is energized for diverting a portion of the high pressure hydraulic fluid through the relief valve 34 by passage through the valve portion 156, through the line 160 and to the reservoir 58. By diverting the high pressure fluid at this time in the cycle, a shock free transition from the rapid or free fall approach of the ram 12 to the mold 16 is provided and the ram 12 moves at the pressing speed.

In FIG. 3, as the ram 12 is shifted from rapid approach speed to pressing speed, the pump 36 is operated at an adjustable partial stroke by de-energizing the No. 1 solenoid in the pump control 162, thereby controlling the pressing speed of the ram 12 as it is moved into molding relationship with the mold 16. In order to provide the desired pressing pressure at a high level, the solenoid valve 108 and the prefill valve 32 are energized. This moves the spool 112 downwardly so that the relatively low pressure hydraulic fluid in the lines 130 and 132 are opened to the blind end of the piston 146 to move the piston 146 and thereby the piston 136 laterally until the valve portion 138 seals with the valve opening 140, to stop free flow of fluid through the gravity feed line 150 from the tank or reservoir 158. By closing the upper chamber 28 of the press cylinder 24 to the unpressurized reservoir oil, the pump 36 provides pressurized fluid at a suitable high level for controlling the pressing movement and pressing pressure of the ram 12 in the mold 16 to form the glassware. The pressurized fluid bypasses through the relief valve 34 while the pressure and volume in the lower press cylinder chamber 26 are controlling the further downward movement of the ram head 18 into the mold 16.

Figure 4:
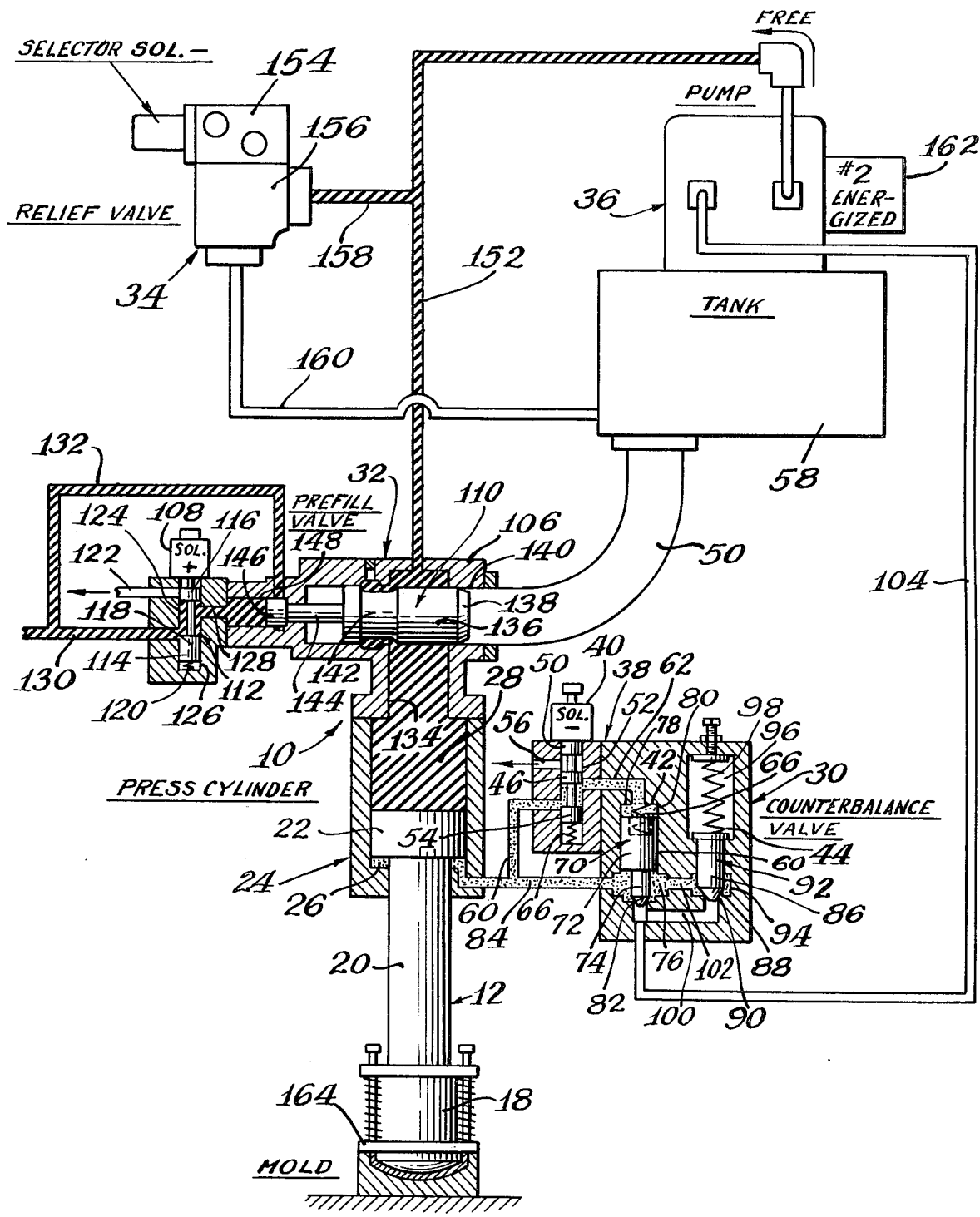
FIG. 4 is a view, similar to FIGS. 1 - 3, wherein the control system and ram are shown when the ram is in the pressing position.

Referring to FIG. 4, when the pressing pressure in the upper chamber 28 of the press cylinder 24 reaches a predetermined level, the solenoid 154 of the relief valve 34 de-energizes after permitting a small amount of oil to be vented to the tank 58 through the valve 34. The press circuit is then in substantially a dwell condition. As seen in FIG. 4, the ram head 18 is completely down in the mold 16 with the glass product or ware W being shown as it is being formed between the ram head 18 and the mold 16. As seen, the spring plate 164, conventionally carried by the ram head 18 of a glass making machine, bears against the open space defined between the head 18 and the mold 16 to prevent passage of molten glass fluid therebetween, while maintaining suitable pressing pressure on the glass during the molding operation. The pump 36 operates to maintain the desired pressure. The pressure within the upper cylinder chamber 28 is maintained by the pump 36 so as to resist forces from the spring of the spring plate 164 tending to lift the ram head out of the mold 16.

After the ram 12 has remained in the dwell position for a sufficient period of time to properly set the glassware W within the mold 16, the control mechanism 10 is designed to gradually break the ram 12 away from the mold 16 so as to not adversely affect the glass product W. At this time, the advantage of the system 10 is realized. The time saved in the overall cycle time during the free fall of the ram 18 to mold 16 has been added to the dwell or pressing time of the ram in the mold to extend the time for cooling and setting the ware.

Figure 5:
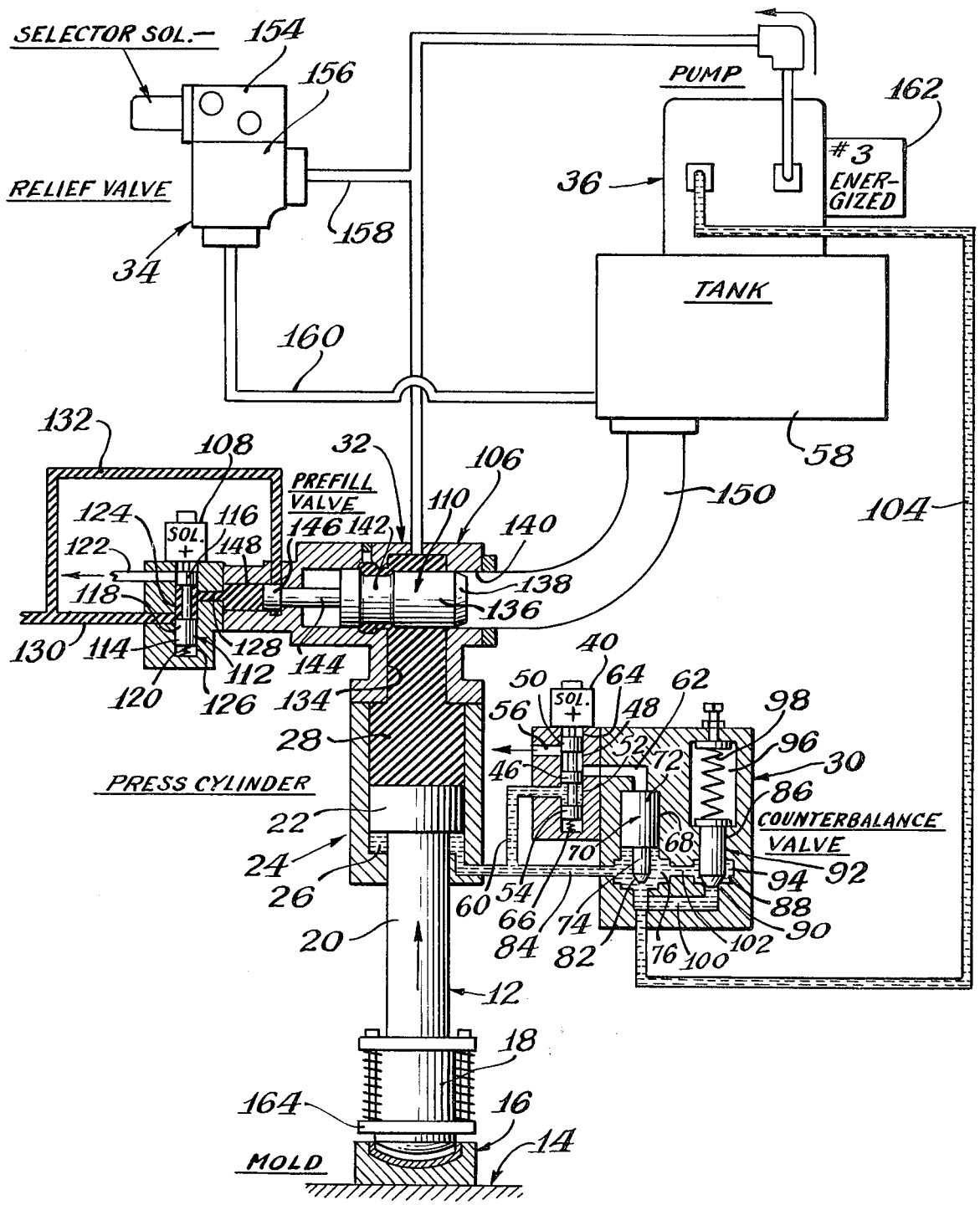
FIG. 5 is a view similar to FIGS. 1 - 4, except the control system and ram are shown as the ram is breaking away from the molded glass product in the mold.

The machine timer (not shown) again momentarily causes tripping a third air operated limit switch (not shown) and energizes a control relay or solenoid in the pump control 162 as seen in FIG. 5. The second control relay in the pump control 162 is also de-energized at this time. The pump 36 is shifted to the other side of the center so as to allow the ram head 18 to gradually break away from the glass W formed in the mold 16. During this time, the prefill valve 42 remains closed to the tank 58 to control the back pressure or pressure in the upper cylinder chamber 28 above the piston 22 during the upward movement of the ram 12. The solenoid 40 of the counterbalance valve 30 opens again causing downward movement of the spool 46 within the chamber 48. This relieves the pressure on the upper side of the piston 72 and the pressure in the lower chamber 76. The piston valve 42 opens to permit fluid from the pump 36 to flow through the line 104, and to the underside of the piston 22 into the lower cylinder chamber 26. The pressure in the upper cylinder chamber 28 relieves through the line 152 and exhaust hydraulic fluid vents to the reservoir or tank 58, at a nominal 60 psi pressure.

Figure 6:
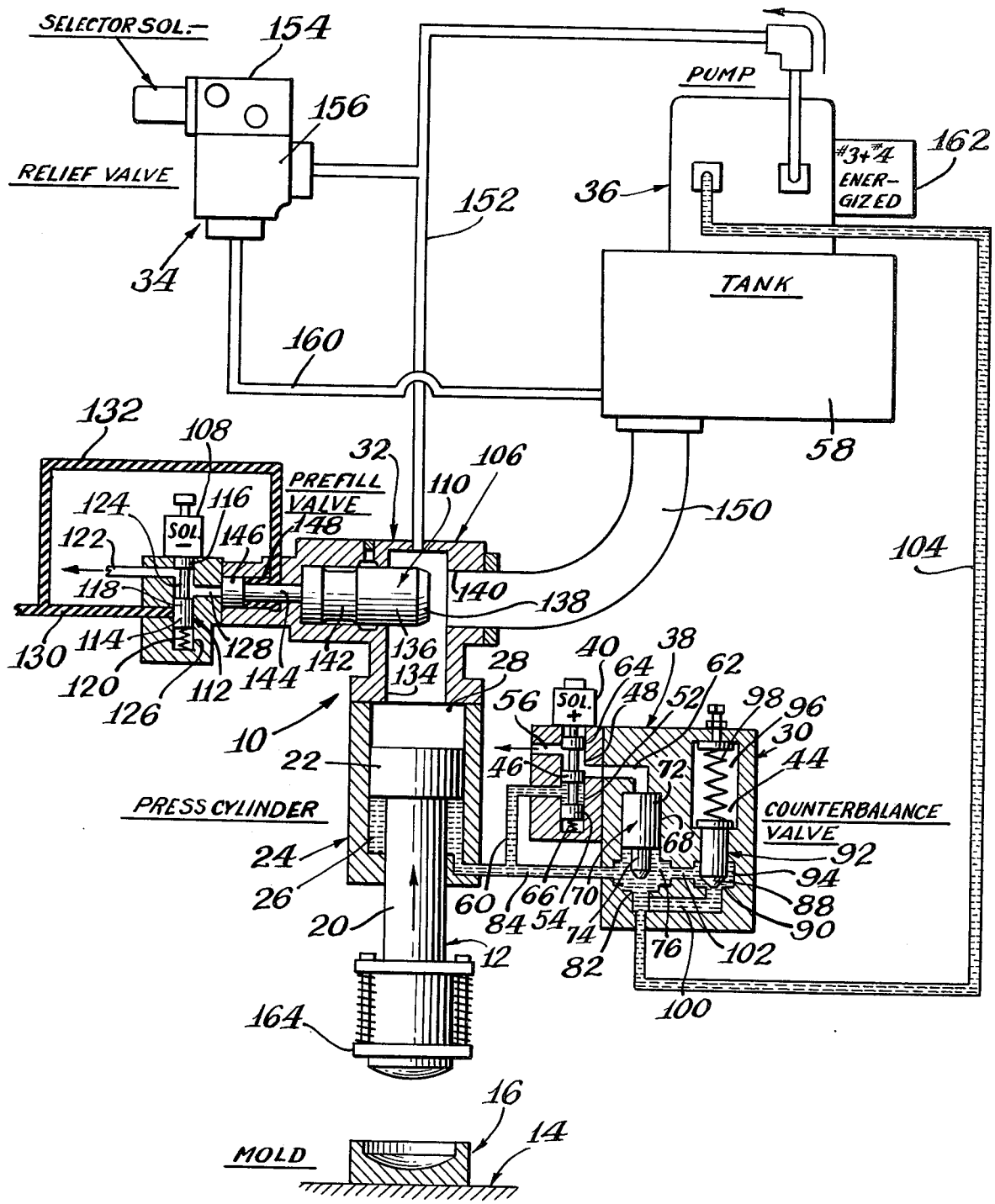
FIG. 6 is a view similar to FIGS. 1 - 5, wherein the ram is shown during the rapid raising of the ram to the full up position.

Referring to FIG. 6, a fourth air signal from the machine timer (not shown) momentarily trips another air operated limit switch (not shown) and energizes a relay or solenoid within the pump control 162. A timer (not shown) is energized and the solenoid 108 in the prefill valve 32 is de-energized causing the spool 112 to move upwardly and open the line 128 to the vent 122. Higher pressure in the chamber 148 retracts the piston 146 and thereby the cylinder piston 136 into an open condition to allow unrestricted flow of hydraulic fluid from the upper cylinder chamber 28 through the feed line 150 to the reservoir 58. At the same time, the pump 36 is shifted to a full stroke condition to rapidly raise the piston 22 and thereby the ram 18 to the raised position. After the timer times out, the ram 12 reaches the full up position, and all solenoids or relays are de-energized. The pump 36 shifts to the center position to stop the upward travel of the piston 22 and thereby the ram 12 and then assume the dwell condition, allowing the table 14, carrying the molds 16, to index. At the same time, the counterbalance valve solenoid 40, as seen in FIG. 1, de-energizes creating a static pressure condition on the underside of the piston 22 or in the lower cylinder chamber 26.

It is seen from the foregoing that I have provided a highly effective and yet simple hydraulic control system for controlling the operation of a press ram, particularly in a glass making machine. The mechanism is unique in increasing the time available for dwell time of the ram within the mold to provide an improved product W without increasing the cycle time for the machine. This is accomplished by the free fall of the ram to the press position. Furthermore, the system provides a controlled entry of the ram into the mold and also provides a controlled easing of the ram 12 from the mold 16 without disturbing or adversely affecting the glass product formed between the ram 12 and the mold 16.

While in the foregoing, there has been provided a detailed description of a particular embodiment of the present invention, it is to be understood that all equivalents obvious to those having skill in the art are to be included within the scope of the invention as claimed.

What I claim and desire to secure by Letters Patent is:

1. In a glass making machine having a mold and a ram movable into said mold for forming a glass product of the desired shape between said ram and said mold, an improved control system for operating said ram, said system comprising, in combination, an upright hydraulic cylinder, a hydraulic fluid supply positioned above said cylinder, a piston vertically and axially movable in said cylinder, said cylinder having upper and lower chambers defined on opposite sides of said piston, a feed line interconnecting said supply to said upper chamber of said cylinder, means for rigidly interconnecting said ram to said piston for simultaneous movement therebetween, first valve means for controlling the flow of hydraulic fluid to and from said upper chamber, second valve means for controlling the flow of hydraulic fluid to and from said lower chamber, means for operating both said first and second valve means, said operating means controlling said first valve means for directing pressurized fluid to said upper chamber and for also gravity feeding hydraulic fluid from said supply to said upper chamber for avoiding cavitation in said upper chamber when said ram is moving downwardly, said feed line being dimensionally sized to cooperate in maintaining said upper chamber substantially full of hydraulic fluid when said ram is moving downwardly, and means for controlling said second valve means for causing the flow of hydraulic fluid from said lower chamber for rapidly lowering said ram to said mold by said pressurized fluid in said upper chamber and by the substanatial free fall action of gravity acting on said ram, said piston, said connecting means and the hydraulic fluid in said upper chamber and without cavitation in said upper chamber, said hydraulic fluid filling said feed line without cavitation during said free fall action, said second valve means including means for venting said lower chamber to atmospheric pressure and said operating means also including means for controlling hydraulic fluid pressure and volume in both said upper and lower cylinder chambers for reducing the speed of said ram as said ram approaches said mold until a fixed pressing position and preselected pressing pressure are attained for forming glass between said mold and said ram, said controlling means including means for deactivating said venting means and causing said second valve means to create pressure in said lower chamber and also including means for operating first valve means for stopping the free flow of hydraulic fluid to said upper chamber while increasing the pressure level in said upper chamber to desired pressing pressure by said first valve means stopping free flow of hydraulic fluid from said supply tank to said upper chamber.

2. The control system of claim 1 wherein said operating means controls said first and second valve means for controlling hydraulic fluid flow and pressure on both of said cylnder chambers for gradually separating said ram from the glass product formed between said ram and said mold.

3. The control system of claim 2 wherein said operating means controls said first and second valve means for controlling hydraulic fluid pressure and flow to both of said cylinder chambers for rapidly raising said ram to the full raised position after said ram has been gradually separated from said glass product.

4. The control system of claim 3 wherein said operating means controls said first and second valve means for controlling hydraulic fluid flow and pressure to both of said cylnder chambers for stopping the upward movement of said piston and said ram and for holding said ram in said raised position.

5. The control system of claim 1 including hydraulic pump means, both of said valve means controlling the flow of hydraulic fluid to and from said pump means and to and from both of said chambers.

6. The control system of claim 1 including a hydraulic fluid reservoir, and hydraulic pump means, said first valve being interconnected to said pump means, said reservoir and said upper chamber.

7. The control system of claim 1 including relief valve means for providing shock free transition from the rapid lowering of said ram to the pressing speed of said ram.

8. The control system of claim 2 including hydraulic pump means, said first chamber controlling means include prefill valve means interposed between said pump means and said first cylinder chamber, and said first chamber controlling means includes counterbalance valve means between said pump means and said second cylinder chamber, said pump means introducing pressurized hydraulic fluid to said second cylinder chamber for gradually separating said ram from said glass formed in said mold.

9. The control system of claim 8 wherein said first valve means is open between said reservoir and said upper chamber for rapidly raising said ram away from said mold by hydraulic fluid pressure from said pump means in said lower chamber, and substantially atmospheric pressure in said upper chamber.

* * * * *